United States Patent Office 2,936,235
Patented May 10, 1960

2,936,235

PHOTOACTIVATION OF AMINOTRIARYLMETH-ANE DYE CYANIDES

Lyman Chalkley, Prince Georges County, Md.

No Drawing. Application March 27, 1957
Serial No. 648,791

19 Claims. (Cl. 96—85)

This invention relates to a photochemical process and product, and more particularly to the photoactivation of the cyanides of the aminotriarylmethane dyes. In my U.S. Patent 2,676,887 there is a general discussion of the role of photoactivators in the photolysis of dye cyanides and a disclosure of five classes of photoactivator materials. The present invention is based upon the discovery of a new class of photoactivator materials, namely the carboxylic acid amides.

The cyanides of the aminotriarylmethane dyes are colorless or light colored materials which show no pronounced change on exposure to light. However, in the presence of a suitable activator, these substances become sensitive to ultraviolet and respond to irradiation by the development of a pronounced color. The photoactivated cyanides are useful for actinometry of the ultraviolet, for measuring the output of germicidal and erythemal lamps, for measuring the strength and dosage of sunlight, and for photography by short wave length ultraviolet. They are also useful in receiving the tracing in recording instruments and for many other uses. In general, the activated dye cyanides have maximum wave lenght limits of sensitivity ranging from a wave length of from about 3000 A.U. to about 3650 A.U.

It has now been found that the carboxylic acid amides provide excellent photoactivators for dye cyanides for the purposes enumerated above, and have numerous advantages over the activator materials previously known. Thus, activators from the amide class provide better solvents for difficultly soluble dye cyanides than the previously known photoactivators, and thereby make possible more concentrated and reactive photosensitive solutions than could be made with the previously known materials. It is also possible to prepare supported photosensitive products having a greater proportion of activated dye by utilizing the increased solvent power of the amide activators. The amides also have the advantage of having substantially no odor and are essentially neutral in reaction. Moreover, the amides are available over a wide range of vapor pressures so that activators for specific usages may be selected as desired. In addition to the provision of liquids of high solvent power, the amides provide a whole series of photoactivators with sufficiently high melting points so that photosensitive systems solid at room temperature can be produced from them. Papers and other sheet materials sensitized with such solid systems provide images that remain sharp and do not diffuse. The amides of the higher fatty acids such as stearamide yield photosensitive waxes which, unlike carbowaxes, are insoluble in water. The solid photosensitive systems are especially useful with the rosaniline series of dye cyanides. However, such systems may be utilized advantageously with all types of dye cyanides. Slow printing materials as well as fast printing materials may be readily formed from the amide activated-dye cyanide systems.

Accordingly, an object of the present invention is to provide novel photosensitive compositions comprising a cyanide of an aminotriarylmethane dye activated with an amide type of activator.

Another object of the invention is to provide highly concentrated and reactive photosensitive compositions and systems utilizing a solution of a dye cyanide in an amide activator.

A further object of the invention is to provide water-insoluble, solid, photosensitive materials and systems containing a dye cyanide and a solid amide activator therefor.

Another object of the invention is to provide slow printing materials utilizing solid sensitizing systems.

A still further object of the invention is to provide a method for increasing the sensitivity of a slow printing material.

Amides suitable for use as photoactivators in accordance with the present invention are the primary amides, the monoalkyl amides, and the dialkyl amides of the aliphatic carboxylic acids. These amides are represented by the formula $RCONR_1R_2$, wherein R may be hydrogen or an aliphatic radical and $R_1$ and $R_2$ are hydrogen or alkyl radicals. Thus, the amides may be any of the series from formamide and its mono and disubstituted derivatives to the amides of the higher fatty acids and their mono and disubstituted derivatives. Examples are: formamide, methyl formamide, dimethyl formamide, diethyl formamide, acetamide, methyl acetamide, dimethyl acetamide, and diethyl acetamide, propionamide, n-butyr amide, n-valer amide, n-capro amide, and stearamide. Amides of the polycarboxylic acids may also be used. The aliphatic radicals of the compounds of these examples are saturated.

The carboxylic acid amides are good photoactivators for both the hydrophobic and hydrophilic dye cyanides. Examples of hydrophobic dye cyanides which are activated by the amides are: Malachite Green Cyanide (4,4'-bis-dimethylamino-triphenylacetonitrile), Brilliant Green Cyanide (the cyanide of the dye having Colour Index 662), Rosaniline Cyanide (the cyanide of the dye having Colour Index 677), Pararosaniline Cyanide (the cyanide of the dye having Colour Index 676), Crystal Violet Cyanide (4,4',4''-tris-dimethylamino-triphenylacetonitrile), Ethyl Violet Cyanide (4,4',4''-tris-diethylamino-triphenylacetonitrile), and new Fuchsine Cyanide (4,4',4''-triamino-3,3',3''-trimethyltriphenylacetonitrile). Examples of hydrophilic dye cyanides which are made photosensitive with amide activators are Formyl Violet Cyanide (the cyanide of the dye having Colour Index 698), Fast Acid Violet Cyanide (the cyanide of the dye having Colour Index 696), Erioglaucine Cyanide (the cyanide of the dye having Colour Index 671), Ethyl Green Cyanide (the cyanide of the dye having Colour Index 685), Xylene Blue AS Cyanide (the cyanide of the dye having Colour Index 673), Aurin Cyanide (4,4',4''-trihydroxy-triphenylacetonitrile), and Patent Blue V Cyanide (the cyanide of the dye having Colour Index 712). The photoactivating property of the amides has been effective with all of the dye cyanide materials tested, and appears to be general. However, since the hydrophilic dye cyanides are readily activated by water and hydrocolloids, the use of the amides as activators is of greatest importance with the hydrophobic types.

As previously stated, the amides form good solvents and photoactivators for the difficult soluble hydrophobic dye cyanides. Those preferred for the violet dye cyanides, crystal violet cyanides and ethyl violet cyanides are the dialkyl carboxylic acid amides, e.g. dimethyl formamide, diethyl formamide, dimethyl acetamide, and diethyl acetamide.

Heretofore, Malachite Green Cyanide in alcoholic solution has been preferred for use in actinometry. The choice of Malachite Green Cyanide was predicated on the fact that it is thirty times as soluble in alcohol as Crystal Violet Cyanide which otherwise would be preferable because of the darker and stronger color which this dye yields on irradiation. (L. Harris and J. Kaminsky, J.A.C.S., v. 57, pages 1158–9; 1935.) Crystal Violet Cyanide has been found to be so soluble in the dialkyl carboxylic acid amides that actinometric solutions are now provided which are vastly superior to the Malachite Green Cyanide in alcoholic solution. Actinometric solutions of Crystal Violet Cyanide in amide activators nearly three times as concentrated as alcoholic Malachite Green Cyanide actinometric solutions can be prepared. These solutions can be used satisfactorily in shorter absorption cells. Moreover, the amide solution of Crystal Violet Cyanide forms a stable color on irradiation and does not require the addition of the hydrochloric acid generally used to prevent fading of the color otherwise undergone by Malachite Green Cyanide solutions in the dark. The use of hydrochloric acid in quantitative work with dye cyanides is hazardous because more than a very small amount reduces the photosensitivity of the solution and may change the absorption spectrum of the dye formed in the photoreaction and thus lead to false results in its colorimetric determination.

The amide activators also provide improved phototropic solutions. While the measurement of total radiant energy requires an irreversible photochemical reaction, the direct measurement of radiant intensity requires a reversible or phototropic reaction, such as was employed by Frankenburger, Robl and Zimmermann, U.S. Patent No. 1,845,835. The patentees utilized alcoholic solutions of Malachite Green Cyanide. Solutions of this dye cyanide in an amide such as diethyl-acetamide may be prepared which are nearly twice as concentrated as the previously known alcoholic solutions and therefore produce a stronger reaction or may be used in thinner layers and smaller apparatus. The activating solvent has a relatively low vapor pressure and does not evaporate like the alcohol from an alcoholic solution. Most importantly, the dark reaction is much faster than in a pure alcoholic solution of Malachite Green Cyanide and therefore the addition of potassium cyanide or hydroxide is not necessary to bring about the attainment of equilibrium within a reasonable time.

The excellent solvent power of the amides has also been found to be useful with the relatively difficultly soluble cyanides of the red aminotriarylmethane dyes, e.g. Rosaniline, Pararosaniline and New Fuchsine. With the cyanides of the red dyes, the primary, monoalkyl and dialkyl carboxylic acid amides are very effective, these dyes being readily soluble in all three types of amides.

Relatively fast-printing materials are provided by dye cyanide compositions activated with the amides of lower molecular weight. Materials that print more slowly are useful in the actinometry of intense light sources, or to follow the course of other slow photochemical reactions.

A slow print paper was provided in Example 13 of U.S. patent, No. 2,676,887 by the addition of a screening dye to the sensitizer. The solid higher-molecular weight amide activators afford a means for attaining the same result without the use of a screening dye.

It has also been found that materials incorporating dye cyanides with solid amide activators and having an initially low photosensitivity can be activated by a simple process to a much higher sensitivity. Such a material may be stored with fewer precautions to exclude radiation than an initially more sensitive material, and may be handled under bright light conditions for placement in a machine where the activation will take place just before use. The slow printing materials are activated by heat treatment at a temperature of about 100° to 110° C. for a short length of time. Long heating is not necessary for effecting the increase in sensitivity. All that is necessary is that the actual temperature of the paper or other activated material be raised to 100° to 110° C. for even a fraction of a second. Thus, the heat treatment may be carried out as a continuous flash heating process, for example, wherein the activated material is passed continuously between heating and cooling means, or may be carried out batchwise in a suitable oven.

The photosensitive compositions may be prepared by dissolving the dye cyanide in the amide at room temperature if the amide used is liquid at this temperature, or the liquid amide may be slightly warmed to speed solution, e.g. to about 100° C. When solid amides are used, they may be heated to a few degrees above their melting point, and the dye cyanide then mixed into the molten mass. The components may also be combined and applied in a common volatile solvent that is later evaporated.

The application of the photosensitive composition to base materials is similar to that described in my aforementioned patent, 2,676,887. Thus, the liquid or molten mixtures may be used to impregnate filter papers, or may be applied as a coating or film to other base materials. The paper used as a support for the activated dye cyanide materials should be free from drying oils and resins. The paper stock used for photographic developing paper is satisfactory, as are the waterleaf papers such as filter papers. Sized papers which are free of rosin or drying oils and other auto-oxidizing substances are also satisfactory. The photosensitive compositions may be supported directly on the paper or on glass or on other base materials. They may also be combined with other materials to modify the action of the ultraviolet radiation. The proportions of dye cyanide and amide activator are not critical and can be varied over a wide range.

A great number of combinations of the dye cyanides and carboxylic acid amides have been prepared and examined. All that have been prepared have proved to be photosensitive at room temperature whether the final product was liquid or solid. The following table provides numerous examples of the dye cyanide amide-

| Amide | Cyanide of— | | | | | | |
|---|---|---|---|---|---|---|---|
| | Malachite Green | Seto glaucine | Crystal Violet | Unidentified Violet | Pararosaniline | Rosaniline | New Fuchsine |
| Formamide | X | X | X | X | X | X | X |
| Methyl formamide | X | X | | X | X | X | X |
| Dimethyl formamide | | X | | X | X | | |
| Diethyl formamide | X | | X | X | X | X | X |
| Acetamide | X | | X | X | | | |
| Methyl acetamide: | | | | | | | |
|   liquid | X | X | X | X | X | X | X |
|   solid | X | | X | | X | | X |
| Dimethyl acetamide | X | X | X | X | X | X | X |
| Diethyl acetamide | X | X | X | X | X | X | X |
| Propionamide | X | | X | | X | X | X |
| n-Butyr amide | X | | X | | X | X | X |
| n-Valer amide | X | | X | | X | X | X |
| n-Capro amide | X | | X | | | X | X |
| Stearamide | | | | | | X | X | activated compositions prepared. In each instance, the dye cyanide was incorporated in the liquid or molten amide, and was applied to a paper base. In the table, the designation "X" indicates that the composition has been made and examined, and found photosensitive. If a combination had been made and found to be insensitive to ultraviolet, a designation "I" would have been placed in the table. No such combinations have been found.

The invention will be further illustrated by the following examples of practice:

Example 1

A solution is made of 5 grams of pararosaniline cyanide in 50 ml. of toluene, 50 ml. of acetonitrile and 100 ml. N-methylacetamide (measured at 30° C.). Twenty pound water leaf paper is impregnated with this solution, and the toluene and acetonitrile evaporated in dry air. The resulting sensitized paper is stored in closed containers. The paper prints out a red image on exposure to ultraviolet of wave lengths shorter than 3300 A., and is more sensitive and prints faster than previous pararosaniline cyanide sensitized materials, such as the paper described in Example 11 of U.S. Patent No. 2,676,887.

Example 2

Another paper that prints faster than previous dye cyanide sensitized materials is prepared as follows: 1 g. of rosaniline cyanide is dissolved at 50° C. in 100 ml. of formamide, the solution diluted with an equal volume of methyl alcohol and used to impregnate water leaf paper, which is air dried to the removal of the methyl alcohol. The paper is strongly photosensitive.

Example 3

Three g. of crystal violet cyanide is dissolved in 1 liter of dimethylformamide at 50° C. and the resulting clear solution stored in a brown bottle. The solution is stable and no crystallization takes place on long storage at 20° C. This solution has many advantages for actionometry over the alcoholic solution of malachite green in alcohol previously recommended.

Example 4

A fast reacting phototropic solution is prepared by dissolving 2 grams of Malachite Green Cyanide in 100 ml. of diethylacetamide at about 50° C. This solution may be used for direct measurement of radiant intensity and requires no additional reagents to bring about the attainment of equilibrium within a reasonable time.

Example 5

Paper is impregnated with a solution of 2 g. of setoglaucine cyanide (the cyanide of the dye having Colour Index 658), prepared as described in Example 4 of my copending application Serial Number 551,982 (now abandoned in favor of continuation-in-part application Serial No. 650,085, which matured into Patent No. 2,877,166, granted March 10, 1959) in 100 ml. of dimethylacetamide and 500 ml. of acetonitrile, and air dried to the complete removal of the acetonitrile. The sensitized paper is stored in closed containers. On exposure to ultraviolet of wave length shorter than about 3400 A. the paper prints a permanent blue image.

Example 6

A slow printing material is prepared as follows:
One g. of new fuchsine cyanide, the prepared by reacting New Fuchsine, Color Index 678, with sodium cyanide is dissolved at 110° C. in 100 g. of stearamide and 30 g. of diethylacetamide. Water leaf paper is impregnated with this solution at 100° to 110°, and then cooled. On exposure to ultraviolet the impregnated paper slowly prints out a deep red image. The printing is slow enough to use in the dosimetry of therapeutic ultraviolet and for sunburn meters to be worn outdoors or at the beach.

Example 7

A slow printing material which may be activated to higher sensitivity is prepared as follows:

Paper is impregnated with a solution of 2 g. of new fuchsine cyanide and 100 g. of hexanamide in 200 ml. of acetonitrile and 400 ml. of toluene at 45° C. The coated paper is air dried to the elimination of the acetonitrile and toluene. So dried, the paper prints a little more slowly than the paper described in Example 6, and does not give as deeply colored an image on long exposure. The hexanamide paper is now heated for 5 minutes in a 110° C. oven and cooled, and the printing speed is increased more than 60 fold.

I claim:

1. A photosensitive composition comprising an intimate admixture of an aminotriarylmethane dye cyanide with an aliphatic carboxylic acid amide activator.

2. A photosensitive composition comprising an intimate admixture of an aminotriarylmethane dye cyanide with a carboxylic acid amide activator having the following formula:

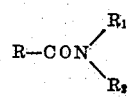

wherein R is selected from the group consisting of hydrogen and an aliphatic radical and $R_1$ and $R_2$ are selected from the group consisting of hydrogen and an alkyl radical.

3. A solid photosensitive composition comprising an intimate admixture of a cyanide of a Rosaniline dye and stearamide.

4. A photosensitive product comprising a supporting base carrying a photosensitive composition comprising an intimate admixture of an aminotriarylmethane dye cyanide with an aliphatic carboxylic acid amide activator having the following formula:

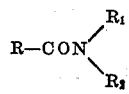

wherein R is selected from the group consisting of hydrogen and a saturated aliphatic radical and $R_1$ and $R_2$ are selected from the group consisting of hydrogen and an alkyl radical of 1 to 2 carbon atoms.

5. A photosensitive product comprising a paper impregnated with a solution of an aminotriarylmethane dye cyanide in an aliphatic carboxylic acid amide having the following formula:

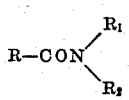

wherein R is selected from the group consisting of hydrogen and a saturated aliphatic radical and $R_1$ and $R_2$ are selected from the group consisting of hydrogen and an alkyl radical of 1 to 2 carbon atoms.

6. A photosensitive product comprising a supporting base carrying a photosensitive composition consisting of an intimate admixture of an aminotriarylmethane dye cyanide and a solid, water-insoluble, aliphatic carboxylic acid amide having the following formula:

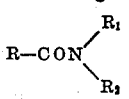

wherein R is selected from the group consisting of hydrogen and a saturated aliphatic radical and $R_1$ and $R_2$ are selected from the group consisting of hydrogen and an alkyl radical of 1 to 2 carbon atoms.

7. A photochemical process comprising the steps of photoactivating an aminotriarylmethane dye cyanide with an aliphatic carboxylic acid amide and irradiating said photoactivated dye cyanide with ultraviolet energy of a wave length to which it is sensitive, said amide having the following formula:

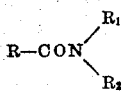

wherein R is selected from the group consisting of hydrogen and a saturated aliphatic radical and $R_1$ and $R_2$ are selected from the group consisting of hydrogen and an alkyl radical of 1 to 2 carbon atoms.

8. The method of increasing the sensitivity of a printing material sensitized with an hydrophobic aminotriphenylmethane dye cyanide and a non-volatile aliphatic carboxylic acid amide activator having the following formula:

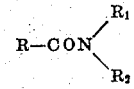

wherein R is selected from the group consisting of hydrogen and a saturated aliphatic radical and $R_1$ and $R_2$ are selected from the group consisting of hydrogen and an alkyl radical of 1 to 2 carbon atoms, comprising: heating said sensitized material to a temperature within the range of from about 100° to 110° C. and cooling it again to room temperature prior to exposure.

9. The method of claim 8 wherein said dye cyanide is the cyanide of the dye having Colour Index 678 and said amide activator is hexanamide.

10. A slow-printing material adapted to be activated to high sensitivity by heating followed by cooling, comprising: a supporting base carrying a photosensitive composition including an intimate admixture of the cyanide of the dye having Colour Index 678 and hexanamide.

11. A fast reacting phototropic solution comprising a solution of 4,4'-bis-dimethylamino-triphenylacetonitrile in diethylacetamide.

12. A photosensitive composition comprising an intimate admixture of an aminotriarylmethane dye cyanide with a carboxylic acid amide activator having the following formula:

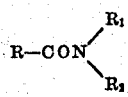

wherein R is selected from the group consisting of hydrogen and a saturated aliphatic radical and $R_1$ and $R_2$ are selected from the group consisting of hydrogen and an alkyl radical of one to two carbon atoms.

13. The photosensitive composition of claim 1 wherein the carboxylic acid amide activator is a primary amide.

14. The photosensitive composition of claim 1 wherein the carboxylic acid amide activator is a mono-alkyl amide.

15. The photosensitive composition of claim 1 wherein the carboxylic acid amide activator is a dialkyl amide.

16. The photosensitive composition of claim 1 wherein the dye cyanide is in solution in the carboxylic acid amide activator.

17. The photosensitive composition of claim 1 wherein the carboxylic acid amide activator is a solid, water-insoluble compound.

18. The photosensitive composition of claim 1 wherein the dye cyanide is of the hydrophobic type and said hydrophobic dye cyanide is in solution in a dialkyl aliphatic carboxylic acid amide activator.

19. The photosensitive composition of claim 1 wherein the dye cyanide is 4,4',4''-tris-dimethylamino-triphenylacetonitrile and said dye cyanide is in solution in a dialkyl aliphatic carboxylic acid amide activator.

References Cited in the file of this patent

UNITED STATES PATENTS

| | | |
|---|---|---|
| 2,312,913 | Kirby | Mar. 2, 1943 |
| 2,528,496 | Chalkley | Nov. 7, 1950 |